(12) United States Patent
Criel et al.

(10) Patent No.: US 8,741,207 B2
(45) Date of Patent: *Jun. 3, 2014

(54) METHOD FOR MANUFACTURING A PLASTIC FUEL TANK COMPRISING A BUILT-IN NECK

(75) Inventors: Bjorn Criel, Merelbeke (BE); Serge Dupont, Vilvoorde (BE)

(73) Assignee: Inergy Automotive Systems Research S.A., Brusells (BE)

( * ) Notice: Subject to any disclaimer, the term of this patent is extended or adjusted under 35 U.S.C. 154(b) by 635 days.

This patent is subject to a terminal disclaimer.

(21) Appl. No.: 11/718,161

(22) PCT Filed: Oct. 27, 2005

(86) PCT No.: PCT/EP2005/055617
§ 371 (c)(1),
(2), (4) Date: Apr. 27, 2007

(87) PCT Pub. No.: WO2006/045838
PCT Pub. Date: May 4, 2006

(65) Prior Publication Data
US 2009/0152263 A1 Jun. 18, 2009

(30) Foreign Application Priority Data
Oct. 28, 2004 (FR) ..................... 04 11550

(51) Int. Cl.
*B29C 43/00* (2006.01)
*B60K 15/04* (2006.01)

(52) U.S. Cl.
USPC ........... 264/533; 264/534; 264/545; 220/4.14

(58) Field of Classification Search
USPC .......... 264/531, 533, 534, 545, 550; 220/4.14
See application file for complete search history.

(56) References Cited

U.S. PATENT DOCUMENTS

| 3,278,665 | A | * | 10/1966 | Harrison | 264/529 |
| 3,397,429 | A | * | 8/1968 | Zavitz et al. | 425/150 |
| 3,949,033 | A | * | 4/1976 | Uhlig | 264/529 |
| 4,339,055 | A | * | 7/1982 | Hutzenlaub | 220/295 |
| 5,020,687 | A | * | 6/1991 | Seizert | 220/645 |
| 5,445,783 | A | * | 8/1995 | Irish et al. | 264/515 |
| 5,605,718 | A | * | 2/1997 | Tinant et al. | 427/236 |

(Continued)

FOREIGN PATENT DOCUMENTS

| DE | 40 08 221 | 9/1990 |
| DE | 197 31 561 | 1/1999 |

(Continued)

OTHER PUBLICATIONS

Machine Generated English Translation of DE 10010900.*

(Continued)

*Primary Examiner* — Martin Rogers
(74) *Attorney, Agent, or Firm* — Oblon, Spivak, McClelland, Maier & Neustadt, L.L.P.

(57) ABSTRACT

A method for manufacturing a plastic fuel tank including a built-in neck, by molding a parison in a mold. The neck is molded by locally deforming the parison using a concave counter-form and a convex form configured to enter the counter-form, these two parts being secured one of them to the mold and the other to a core located inside the mold, or vice versa.

8 Claims, 3 Drawing Sheets

(56) References Cited

U.S. PATENT DOCUMENTS

| | | | |
|---|---|---|---|
| 5,660,206 A | * | 8/1997 | Neal et al. .................. 137/592 |
| 6,726,873 B1 | * | 4/2004 | Clarke ......................... 264/532 |
| 2002/0130515 A1 | | 9/2002 | Mlyajima et al. |
| 2003/0168853 A1 | | 9/2003 | Mueller et al. |

FOREIGN PATENT DOCUMENTS

| | | | | |
|---|---|---|---|---|
| DE | 100 10 900 | | 9/2001 | |
| DE | 10010900 | * | 9/2001 | ............. B29C 69/00 |
| DE | 102 14 900 | | 4/2004 | |
| EP | 1 110 697 | | 6/2001 | |
| GB | 1 410 215 | | 10/1975 | |
| GB | 1 485 504 | | 9/1977 | |
| WO | WO 2004/007182 | * | 1/2004 | ............. B29C 69/00 |

OTHER PUBLICATIONS

French Application FR 04.11550 made available through International Application PCT/EP2005/055617 Original French Application filed Oct. 28, 2004.*
U.S. Appl. No. 11/993,424, Criel et al.
U.S. Appl. No. 11/579,494, filed Nov. 3, 2006, Plissart, et al.
U.S. Appl. No. 11/575,421, filed Mar. 16, 2007, Criel.
U.S. Appl. No. 11/721,735, filed Jun. 14, 2007, Mabed et al.
U.S. Appl. No. 11/721,785, filed Jun. 14, 2007, Criel et al.
U.S. Appl. No. 11/721,775, filed Jun. 14, 2007, Criel et al.
U.S. Appl. No. 11/658,085, filed Jan. 22, 2007, Criel, et al.
U.S. Appl. No. 12/161,870, filed Jul. 23, 2008.
U.S. Appl. No. 12/278,525, filed Aug. 6, 2008.
U.S. Appl. No. 11/908,336, filed Sep. 11, 2007, Criel et al.

* cited by examiner

METHOD FOR MANUFACTURING A PLASTIC FUEL TANK COMPRISING A BUILT-IN NECK

TECHNICAL FIELD

The present invention relates to a method for manufacturing a plastic fuel tank comprising a built-in neck; to apparatus for implementing the said method and to a petrol tank resulting from this method/apparatus and using the built-in neck for attaching its filler pipe, a spout or a flange.

BACKGROUND

Fuel tanks on board vehicles of various kinds generally have to meet imperviousness and permeability standards in relation to the type of use for which they are designed and the environmental requirements that they have to satisfy. Both in Europe and throughout the world we are currently experiencing a considerable tightening of the requirements concerned with limiting the emissions of pollutants into the atmosphere and into the environment in general. The design of fuel tanks is therefore evolving quickly towards techniques capable of better guaranteeing the imperviousness and safety under varying conditions of use. Furthermore, attempts are also being made to minimize the losses originating from the pipes and various accessories connected to the tanks. For example, the attaching of pipes and, in particular, of the filler pipe, spouts and flanges to the tank may present problems of permeability. With a view to reducing these problems, various solutions are proposed, most of which call upon an intermediate part or neck. However, problems of imperviousness may still arise at this neck.

Hence, patent application US 2002/0130515 proposes a method for directly incorporating a neck into the tank during the blowing of the latter. However, this solution leads to a neck the wall thickness of which is not constant, something which is not ideal for impervious coupling and, furthermore, may lead to problems of impact strength and additional materials costs (it being necessary to have an excess thickness in order for at least the minimum thickness required to be achieved throughout).

It is therefore an object of the invention to provide a method which also allows a neck to be incorporated into a plastic fuel tank at the time of its manufacture by moulding, but does so using a method and apparatus which are such that the wall thickness of the neck is very uniform and therefore makes it possible to avoid the abovementioned problems.

SUMMARY

To this end, the invention relates to a method for manufacturing a plastic fuel tank comprising a built-in neck, by moulding a parison in a mould, in which method the neck is moulded by locally deforming the parison using a concave counter-form and a convex form able to enter the counter-form, these two parts being secured one of them to the mould and the other to a core located inside the mould, or vice versa.

The term "fuel tank" is intended to denote a sealed tank able to store fuel under diverse and varying environmental and usage conditions. An example of this tank is a tank fitted to motor vehicles.

The fuel tank according to the invention is made of plastic.

The term "plastic" denotes any material comprising at least one synthetic resin polymer.

All types of plastic may be suitable. Particularly suitable plastics come from the thermoplastics category.

The term "thermoplastic" denotes any thermoplastic polymer, including thermoplastic elastomers, as well as blends thereof. The term "polymer" denotes both homopolymers and copolymers (especially binary or ternary copolymers). Examples of such copolymers are, non-limitingly, random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10 degrees Celsius are particularly suitable. Examples of such materials include those that exhibit polydispersion in their molecular weight.

In particular, polyolefins, thermoplastic polyesters, polyketones, polyamides and copolymers thereof may be used. A blend of polymers or copolymers may also be used, as may a blend of polymer materials with inorganic, organic and/or natural fillers such as, for example, but non-limitingly, carbon, salts and other inorganic derivatives, natural fibres or polymeric fibres. It is also possible to use multilayer structures consisting of stacked layers bonded together comprising at least one of the polymers or copolymers described above.

One polymer that is often used is polyethylene. Excellent results have been obtained with high density polyethylene (HDPE).

The wall of the tank may be made up of a single layer of thermoplastic or of two layers. One or more other possible additional layers may, advantageously, consist of layers of a material that forms a barrier to the liquids and/or gases. As a preference, the nature and thickness of the barrier layer are chosen in such a way as to limit as far as possible the permeability towards the liquids and gases in contact with the interior surface of the tank. As a preference, this layer is based on a barrier resin, that is to say on a resin impermeable to the fuel such as EVOH for example (a copolymer of ethylene and partially hydrolysed vinyl acetate). Alternatively, the tank may be subjected to a surface treatment (fluoration or sulphonation) the purpose of which is to render it impermeable to the fuel.

According to the invention, the tank is produced by moulding a parison. A "parison" is intended to mean a preform, generally extruded, which is intended to constitute the wall of the tank once it has been moulded to the required shape and size. This preform does not necessarily have to be made as a single piece.

Thus, advantageously, the parison in fact consists of two separate pieces, which may for example be two sheets. However, as a preference, these pieces result from the cutting of one and the same extruded tubular parison as described in application EP 1110697 in the name of the Applicant Company and the content of which is, for this purpose, incorporated by reference into this application. According to this variant, once a single parison has been extruded it is cut along its entire length, along two diametrically opposed lines, to obtain two separate parts (sheets).

By comparison with the moulding of two separately extruded sheets, the thickness of which is therefore constant, this approach makes it possible to use parisons of variable thickness (that is to say a thickness that is not constant along their length), obtained by virtue of an appropriate extrusion device (generally an extruder fitted with an adjustable punch die). A parison such as this takes account of the reduction in thickness which occurs during moulding at certain points on the parison, as a result of the non-constant rates of deformation of the material in the mould.

According to the invention, the parison is deformed locally to mould a neck intended for the attachment of a pipe, a spout or a flange to the tank. As a preference, this is the tank filler pipe which is generally a part of relatively complex geometry, moulded separately from the tank. It may also be a spout for connecting venting lines or fuel lines for instance, or a flange bearing accessories. This neck generally has a substantially cylindrical shape, a wall more or less as thick as that of the tank and a length suited to obtaining a strong mechanical attachment of the pipe that is to be coupled to it. Said neck may bear a thread (for instance for fixation by screwing of a flange bearing a complementary thread).

The moulding of the neck is generally performed independently from the moulding of the tank proper. It may take place before or after the latter moulding operation. For practical reasons, it preferably takes place before the tank is moulded, or, in any case, prior to the last step of this moulding operation (which may be the assembling of two shells moulded separately in the same mould for example). Indeed, certain methods have recourse to the insertion of a core prior to the moulding of the tank for other reasons (for incorporating accessories for example) and this step may then be put to good use for (at least partially) moulding the neck.

In general, the method according to the invention comprises at least the following steps:
  a parison is introduced into the mould;
  the core is introduced into the mould, inside the parison;
  the mould is closed;
  the parison is pressed firmly against the mould cavity by blowing through the core and/or drawing a vacuum behind the mould;
  the neck is moulded by displacing the form within the counter-form.

Thus, according to the invention, the moulding of the neck occurs using two complementary pieces: a convex form (or punch) and a concave counter-form both of suitable shape and size that the form can penetrate the counter-form and, in doing so, mould the neck through local compression of the material. These two pieces are secured one to the core and the other to the mould. What that means is that if the counter-form is secured to the core (in the case of a re-entrant neck), then the form is secured to the mould, and vice versa (in the case of a protruding neck). These two pieces are therefore, at a given point in time, able to move one relative to the other because the form has to be able to penetrate the counter-form in order to mould the neck. In general, the movement of one of the two pieces is brought about by a suitable device of the hydraulic ram type. This device is advantageously borne by the core (and so too therefore is the moving piece).

In the case a neck bearing a thread must be moulded, said thread can be incorporated into the form so that after its moulding, the tank must be taken off the mould by unscrewing said part (neck) from the mould.

Advantageously, the moulding of the neck is carried out in such a way as to compensate for the reduction in thickness that has a natural tendency to form in the final part of the neck (the end furthest from the parison).

With the same end result in mind, and still to encourage a constant wall thickness in the vicinity of the neck, the parison is preferably kept under compression around the neck during withdrawal of the form from the counter-form.

In the method according to the invention, the tank may be moulded by blow-moulding the parison (pressing the parison firmly against the mould using a pressurized fluid (generally air)). In this method, the parison has sometimes already experienced the influence of the pressurized fluid before the neck is blown and/or formed, this being with a view to ensuring that the parison is firmly pressed against the mould. Thus, for example, before blowing and/or moulding the neck, it may prove advantageous to press the parison against the mould by blowing through the core. In consequence, in such an instance, before withdrawing the core from the mould, the mould will need to be degassed in order, in particular, to avoid an excessively sudden expansion of the trapped pressurized fluid, and the accompanying noise.

Hence, according to a preferred variant, the method according to the invention comprises the following steps:
  a parison is introduced into the mould;
  the core is introduced into the mould, inside the parison;
  the mould is closed;
  the parison is pressed firmly against the mould cavity by blowing through the core and/or drawing a vacuum behind the mould;
  the neck is moulded by displacing the moving piece within the counter-form;
  degassing is performed;
  the mould is opened to withdraw the core;
  the mould is closed again onto the parison and the parison is blown in order to produce the tank;
  the tank is removed from the mould.

The degassing step may be done in any appropriate way. In general, the parison is first of all pierced (for example by puncturing it with a needle) and then the fluid is let out of the mould (for example using a valve).

Alternatively, the tank may be moulded by thermoforming the parison (i.e. by pressing the parison (=one or two sheet(s) of molten material) firmly against the wall of the thermoforming mould by drawing a vacuum in the volume between the molten material and the wall of the mould).

Blowing yields good results particularly from the viewpoint of the duration of the manufacturing cycles. For a given manufacturing rate, this method therefore requires a lower investment in machinery (by comparison with thermoforming, whether vacuum thermoforming (as described hereinabove) or compression thermoforming (using a core or punch)).

According to the invention, having moulded the tank incorporating the neck, the end of this neck has then to be cut off in order to disengage it. This cutting is done by any appropriate means. As a preference, this cutting is performed using a rotary cutter or any other tool capable of making a cut without generating chips.

The present invention also relates to apparatus suitable for applying the method described hereinabove. According to this aspect, the invention relates to apparatus comprising a core and a mould, these two pieces being equipped one with a concave counter-form and the other with a convex form which is able to penetrate the counter-form in order to form a neck.

As explained above, a thread can be incorporated into the form in order to obtain a neck on which a part (like a flange) bearing a complementary thread can be screwed.

As a preference, these two elements (form and counter-form) have suitable shape and size that the neck can be compression moulded avoiding the reduction in wall thickness at its end, as mentioned hereinabove.

Likewise, in order to be able to apply local compression around the neck as the form is being withdrawn, as mentioned hereinabove, the form or the counter-form of this apparatus is preferably secured to a support equipped with at least one spring. This support then advantageously has a shape, size and location which is such that, as the moving piece (generally, the one supported by the core) is being withdrawn, the support is pressed against the parison, around the neck, by the said spring, so as to maintain local compression at that point. The intensity and duration of this compression depend on the rating of the spring. Alternatively or in addition, the function of the spring may be exerted by the blowing pressure.

Advantageously, especially in the case the neck is intended for fixation of the filler pipe, it is moulded towards the inside of the tank (a so-called re-entrant neck) so as to lie inside the internal volume delimited by the wall of this tank. As far as the apparatus used is concerned this means that the part secured to the core is preferably the counter-form and that therefore the part secured to the mould is the form. One advantage of a re-entrant neck is that the diameter of the external skin is sized throughout the blowing cycle (and/or possibly during the post-blowing/post-cooling cycle). This improves the tolerances on this external skin (which ultimately constitutes the internal surface of the neck) and, by doing so, improves the quality of the weld welding any further components there might be into this neck (for example using a hot filament). In the case of a protruding neck (where the moving piece (the one secured to the core) is the form), sizing is performed only during the forming of this neck by the core and then by the blowing pressure.

As a preference, the re-entrant neck is substantially cylindrical and exhibits an entry taper, that is to say that the transition between the surface of the tank and that of the cylindrical neck is rounded. As a preference, this rounding has a fillet radius of at least 5 mm, or even 10 mm. This radius does not, however, advantageously exceed 20 mm. It is advantageously larger if there is space available in the vehicle environment, because that improves impact strength. The presence of such an inlet taper makes assembling the parts easier and limits the risk of stress raisers.

In certain instances it may be advantageous to mould a flange (or other coupling of appropriate geometry) as one piece with the neck, so as to make it easier to couple an external piece to the said neck. Finally, the present invention also relates to a plastic fuel tank that can be obtained by a method or apparatus as described hereinabove. In particular, it relates to such a tank comprising a built-in neck the wall thickness of which is constant to within +/−0.1 mm (in which case it is said to have a tolerance of 0.1 mm).

Such a tank advantageously has a filler pipe, a spout or a flange fixed to the said neck. This fixing may be done in any known way. Thus, for example, it may be by mechanical fastening (using a pipe clamp for example, or merely by screwing in the case the neck and the pipe, spout or flange are bearing complementary threads), by welding, etc.

One particularly suitable means (besides screwing as explained above) is to weld using a coupling comprising a heating filament (that is to say a metal filament which heats up under an electrical effect when a current is passed through it and does so to a sufficient extent that it melts the plastic and produces the weld). As a particular preference, the said coupling and the weld using it are as described in patent US 2003/0168853 the content of which for this purpose is incorporated by reference into this application. In particular, the coupling has a shape that is appropriate in facilitating the coupling of the heating filament to the source of electrical power. Specifically, the precise dimensions (particularly close tolerances) of the neck moulded using the method according to the invention lend themselves particularly well to this method of welding and make it possible to obtain a particularly uniform weld and to do so repeatably.

The present invention is illustrated non-limitingly by FIGS. 1 to 3 where identical numerals denote identical elements, namely: a core (1), a moving piece secured to the core (2) and a mould (3).

DETAILED DESCRIPTION

Figure 1:
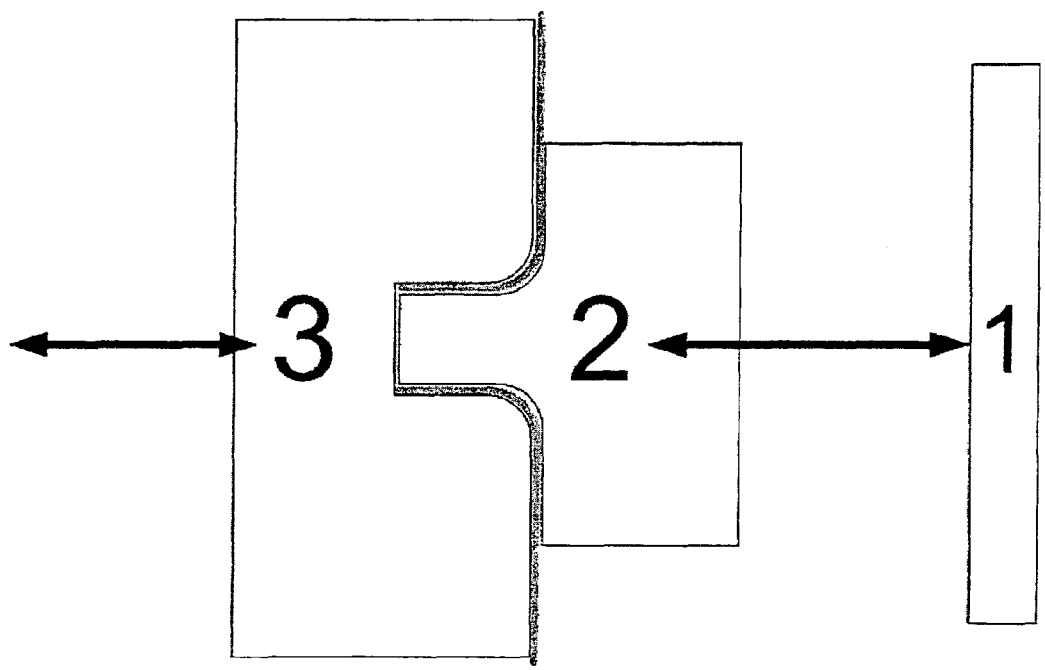
FIG. 1 depicts a schematic view of an embodiment of the invention.

The variant illustrated in FIG. 1 is the one in which the moving piece (2) secured to the core (1) is the form and in which the counter-form is secured to the mould (3). This is the case of a protruding neck in which the form is in contact with the neck and therefore sizes the neck only during the formation of the neck.

Figure 2:
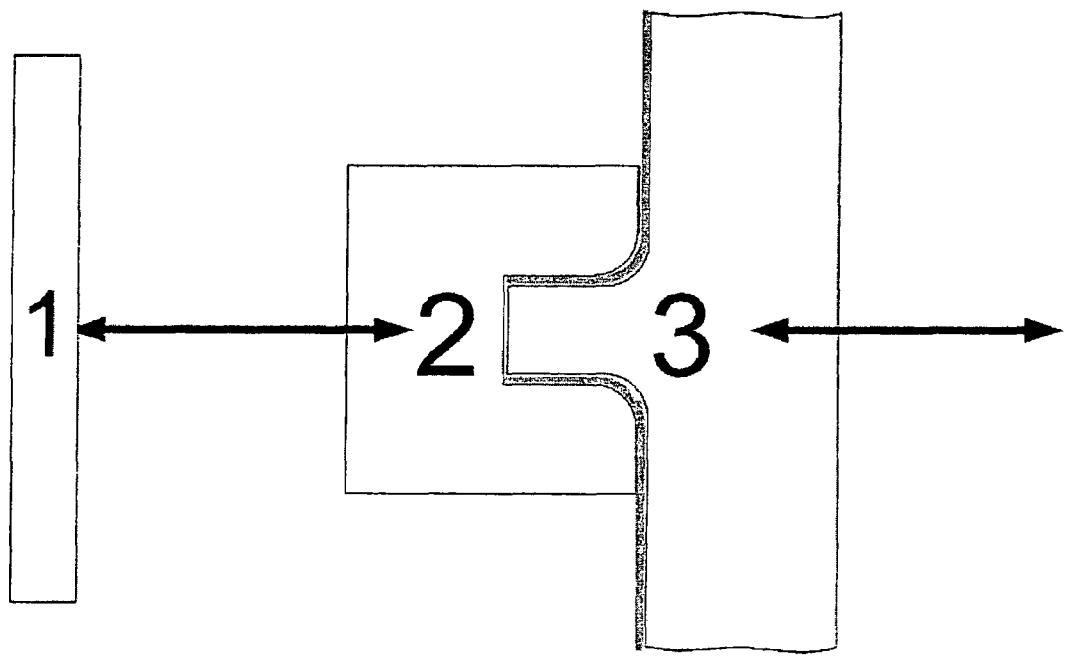
FIG. 2 depicts a schematic view of another embodiment of the invention.
Figure 3:
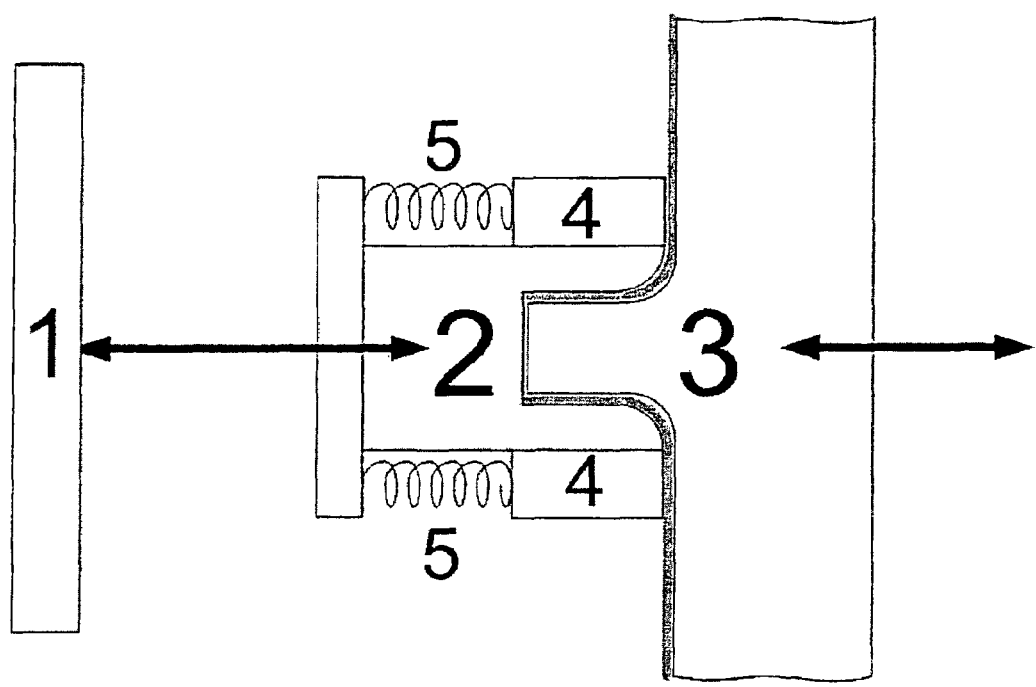
FIG. 3 depicts a schematic view of an alternative embodiment of the invention.

In the variants illustrated in FIGS. 2 and 3 on the other hand, the moving piece (2) secured to the core (1) is the counter-form and the form is secured to the mould (3). This is the case of a re-entrant neck and the form remains in contact with the neck, and therefore sizes the latter also during the moulding of the tank.

In the variant illustrated in FIG. 2, when the counter-form is removed from the form via the core, there is global decompression of the material in and around the neck. By contrast, in the variant illustrated in FIG. 3, because of the presence of a support (4) equipped with two springs (5), when the counter-form is removed the support remains in contact with the perimeter of the neck for a while longer (until the springs return the said support), making it possible to maintain the compression of the material at this point and, in doing so, to obtain better uniformity of thickness.

In each of the cases depicted, it is necessary for it to be possible to release the neck from the mould. For that to be possible it is necessary in certain instances to provide an additional moving piece in the mould, this is what is indicated by the second arrow in the figures (the one which does not lead from the moving piece (2) proper).

The invention claimed is:

1. A method for manufacturing a plastic fuel tank including a built-in neck, by molding a parison in a mold, comprising:
    blow-molding the tank by pressing the parison against the mold using a pressurized fluid, before molding the neck; and
    molding the neck by locally deforming the parison via displacement of a concave counter-form and a convex form configured to enter the concave counter-form,
    wherein a shape of the convex form corresponds to a shape of the concave counter-form, and
    wherein one of the concave counter-form and the convex form is movable and is movably attached to one of the mold and a core, and the other one of the concave counter-form and the convex form is secured to the other one of the mold and the core.

2. The method according to claim 1, wherein the tank includes HDPE and a layer of a barrier material or has been subjected to a surface treatment to render the tank impermeable to a fuel.

3. The method according to claim 1, wherein the parison consists of two sheets resulting from cutting an extruded tubular parison.

4. The method according to claim 1, further comprising, attaching to the neck at least one of a filler pipe, a spout, and a flange by screwing, or by welding using a heating filament incorporated into a welding coupling.

5. The method according to claim 1, further comprising:
    movably attaching one of the convex form and the concave counter-form to one of the mold and the core;
    securing the other one of the convex form and the concave counter-form to the other one of the mold and the core;

introducing the parison into the mold;
introducing the core into the mold, inside the parison;
closing the mold;
pressing the parison against a mold cavity; and
molding the neck by displacing the convex form relative to the concave counter-form.

6. The method according to claim 1, wherein the neck is molded so as to compensate for a reduction in thickness that tends to form in an end of the neck furthest from the parison.

7. The method according to claim 1, further comprising:
keeping the parison under compression around the neck during withdrawal of the convex form from the concave counter-form, wherein the compression is maintained by a support attached to one of the convex form and the concave counter-form.

8. The method according to claim 7, wherein the support is attached by at least a spring.

* * * * *